June 11, 1940. E. POSADA ZENDEJAS 2,203,853
PROTECTIVE DEVICE FOR ELECTRICAL CIRCUITS
Filed Nov. 13, 1939
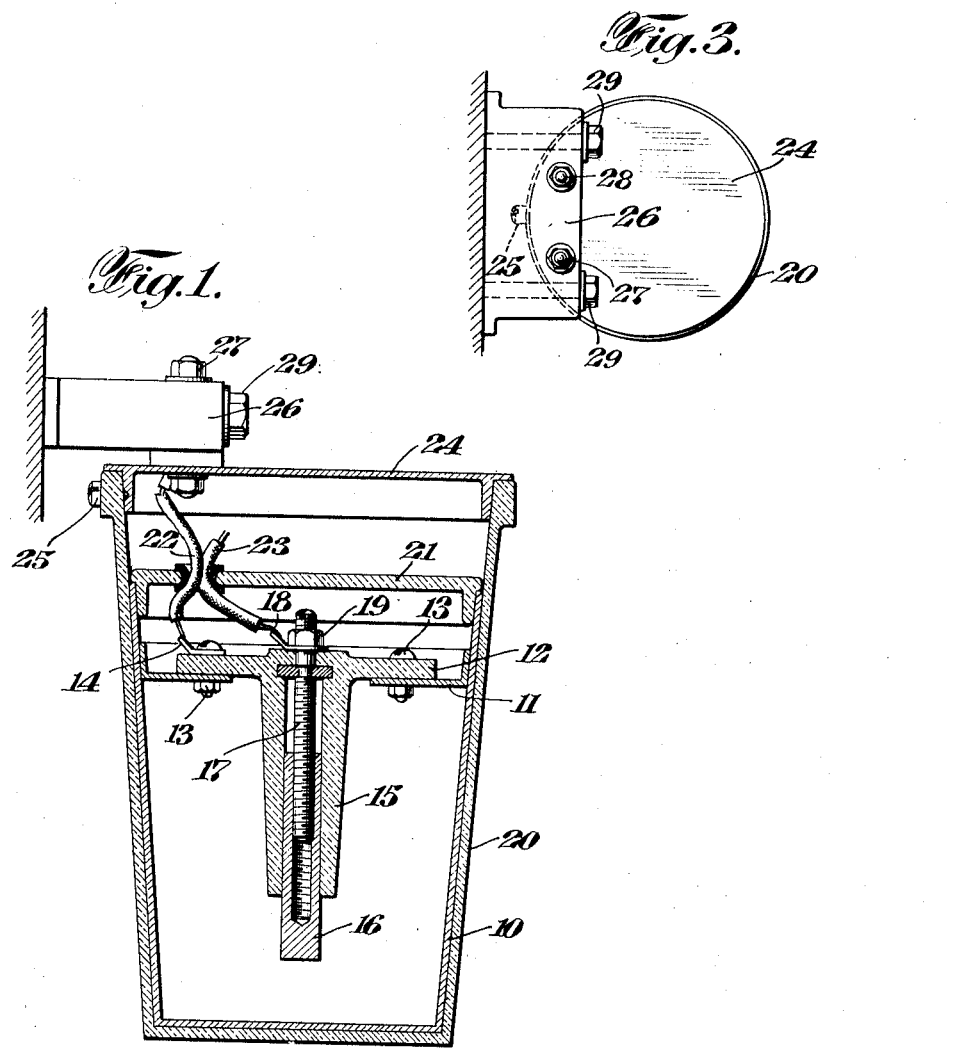
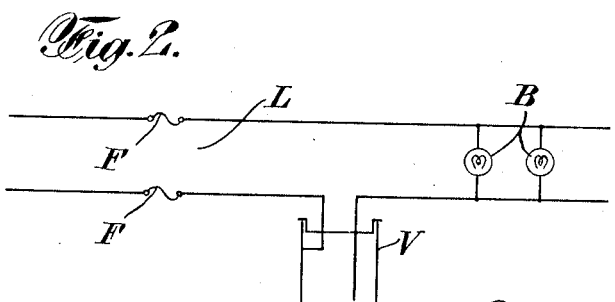
INVENTOR
Eduardo Posada Zendejas
BY
Kenyon & Kenyon
ATTORNEYS Patented June 11, 1940

2,203,853

UNITED STATES PATENT OFFICE 2,203,853

PROTECTIVE DEVICE FOR ELECTRICAL CIRCUITS

Eduardo Posada Zendejas, Mexico, D. F., Mexico, assignor to Electrol S. A., a corporation of Mexico Application November 13, 1939, Serial No. 303,936

6 Claims. (Cl. 175—319)

This invention relates to protective devices for electrical circuits and has for an object an electrolytic valve for connection in series in an electrical circuit to prevent the passage of a higher current than that for which it is gauged, thereby avoiding the undue use of electrical current and also the danger incident to a short circuit.

A device embodying the invention permits the flow of sufficient current in the circuit to supply the requirements of the electrical apparatus included in the circuit, but in the event of a short circuit limits the flow of current to a predetermined value, such as to prevent undue heating of the wires and other effects incident to a short circuit. Upon the short-circuit being corrected, the device functions as it did prior to the establishment of the short-circuit.

The device consists of a pair of electrodes in contact with an electrolytic solution. When this device is connected in series in an electrical circuit, it limits the passage of current in said circuit to a predetermined maximum, thereby preventing the dangers incident to overloading of a circuit. The valve may be used in connection with direct current or alternating current circuits and when used in alternating current circuits does not alter the frequency of the current.

Other objects, novel features and advantages of this invention will become apparent from the following specification and accompanying drawing, wherein:

Fig. 1 is a section through the valve,

Fig. 2 is a circuit diagram, and

Fig. 3 is a plan view of the valve.

In the drawing, L represents a house-lighting circuit or the like equipped with the usual fuses F and having lamps B or other electrical apparatus connected in the circuit. The valve V which embodies the invention is connected in one side of the circuit L between the fuse F and the lamps B.

The valve consists of a metal container 10 which also serves as an electrode. A flange 11 extends inwardly from the container 10 and supports a disk 12 of insulating material which is fastened to the flange 11 by bolts 13. One of the bolts also attaches a terminal 14 to the disk 12, the terminal 14 being electrically connected by the bolt to the container electrode 10.

The disk 12 is provided with a downwardly projecting extension 15 in which is slidably mounted a metallic bar 16 constituting the second electrode of the valve. A rotatable screw-threaded rod 17 supports the electrode 16 for vertical adjustment upon rotation of the rod so that the exposed portion of the electrode may be changed in length. A terminal member 18 is connected to the rod 17 above the disk 13 by a nut 19.

The metallic container 10 is encased by a vessel 20 of insulating material which extends beyond the upper edge of the container 10. An insulating cover 21 closes the container 10 and is provided with an aperture through which extend wires 22 and 23 leading to the terminals 14 and 18 respectively. A cover 24 closes the top of the vessel 20 and is attached thereto by any suitable means such, for example, as the screws 25. A bracket 26 is attached to the cover 24 and constitutes means for suspending the valve.

The disk 12 hermetically seals the container 10 and within the container is an electrolytic solution into which the electrode 16 projects. Such electrolyte is preferably composed of amorphous silicate (infusorial earth, for instance), distilled water, sodium chloride, gallic acid and tannic acid. The infusorial earth is for the purpose of making the solution semi-solid and any other suitable material may be used for this purpose. The proportions by weight of the substances used preferably are:

| | Parts |
|---|---|
| Water | 100 |
| Infusorial earth | 45 |
| Sodium chloride | 8 |
| Tannic acid | .6 |
| Gallic acid | .5 |

The proportions of the ingredients of the electrolyte are varied in accordance with the amount of current the valve is gauged for and regulation of the amount of current which the valve will transmit is effected by adjustment of the electrode 16.

Under normal circuit conditions, the cell passes the current necessary to energize the devices in circuit with it and a certain amount of electrolysis takes place in the cell, the gas produced by such electrolysis being insufficient appreciably to affect the current flow. When the quantity of energy supplied to the cell suddenly increases as the result of a short circuit, the gas produced by electrolysis increases rapidly and forms high resistance layers between the electrodes to increase the interior impedance or resistance of the cell sufficiently to prevent flow of an amount of current more than the cell is gauged for. The cell may be gauged for different amperages but the highest amperage that any cell will pass is insufficient to cause undue heating of the conductors or other effects incident to short circuits. Also, the area of contact of the electrode 16 with the electrolyte may be varied by vertical adjustment thereof through the medium of the rod 17 thereby regulating the maximum current which the valve will transmit.

The outer electrode or container 10 may be composed of any of the metals iron, zinc, nickel, chromium-plated iron, tinned iron or platinum and the inner electrode may be composed of any of the same metals as the outer electrode as well as carbon in the form of retort charcoal. It is advisable that the inner electrode be made of pure metal to make it of as long life as possible and also to avoid corrosion of it as far as possible. For a given dimension of the electrodes, there corresponds a load which the valves will stand without interrupting the circuit and the use of one metal or the other for the construction of the electrodes is mainly a question of economy. In cases where it is not important that the solution be semi-solid, the thickening material may be omitted.

It is of course understood that various modifications may be made in the structure and arrangement of parts as well as the preparation of ingredients in the electrolyte without in any way departing from the spirit of the invention as disclosed.

I claim:

1. An electrolytic valve characterized by increase of internal resistance with increase of applied voltage, said valve comprising a body of electrolyte and a pair of metal non-film forming electrodes in contact with said electrolyte, said electrolyte consisting of a solution of water, sodium chloride, tannic acid, gallic acid and a thickening agent.

2. An eltctrolytic valve characterized by increase of internal resistance with increase of applied voltage, said valve comprising a body of electrolyte and a pair of metal non-film forming electrodes in contact with said electrolyte, said electrolyte consisting of the following ingredients substantially in the weight proportions indicated: 100 parts water, 45 parts thickening agent, 8 parts sodium chloride, 0.6 part tannic acid and .5 part gallic acid.

3. An electrolytic valve characterized by increase of internal resistance with increase of applied voltage, said valve comprising a closed metal container constituting one electrode, an electrolyte solution in said container, and a second electrode insulatingly supported by said container and extending into said electrolyte solution, said electrolyte solution consisting of water, sodium chloride, tannic acid, gallic acid and a thickening agent, said electrodes being composed of non-film forming metal.

4. An electrolytic valve characterized by increase of internal resistance with increase of applied voltage, said valve comprising a closed metal container constituting one electrode, an electrolyte solution in said container, and a second electrode insulatingly supported by said container and extending into said electrolyte solution, said electrodes being formed of non-film forming metal and said electrolyte consisting of the following ingredients substantially in the weight proportions indicated: 100 parts water, 45 parts thickening agent, 8 parts sodium chloride, 0.6 part tannic acid and .5 part gallic acid.

5. An electrolytic valve characterized by increase of internal resistance with increase of applied voltage, said valve comprising a body of electrolyte and a pair of metal non-film forming electrodes in contact with said electrolyte, said electrolyte consisting of a solution of water, sodium chloride, tannic acid and gallic acid.

6. An electrolytic valve characterized by increase of internal resistance with increase of applied voltage, said valve comprising a body of electrolyte and a pair of metal non-film forming electrodes in contact with said electrolyte, said electrolyte consisting of the following ingredients substantially in the weight proportions indicated: 100 parts water, 8 parts sodium chloride, 0.6 part tannic acid and .5 part gallic acid.

EDUARDO POSADA ZENDEJAS.